United States Patent [19]

Murray

[11] 4,254,562
[45] Mar. 10, 1981

[54] COMBINATION CARDIOVASCULAR ELECTRONIC DISPLAY/TEACHING APPARATUS, SYSTEM AND METHODS OF CONSTRUCTING AND UTILIZING SAME

[76] Inventor: David Murray, 18609 Greenlawn, Detroit, Mich. 48221

[21] Appl. No.: 12,070

[22] Filed: Feb. 14, 1979

[51] Int. Cl.³ .......................... G09B 23/28; G09B 7/10
[52] U.S. Cl. .................................... 434/267; 434/112; 434/338
[58] Field of Search ...................... 35/9 C, 17, 40, 9 B

[56] References Cited

U.S. PATENT DOCUMENTS

| | | | |
|---|---|---|---|
| 3,256,765 | 6/1966 | Siegel | 35/9 C UX |
| 3,736,671 | 6/1973 | Oleinick | 35/9 C |
| 4,091,549 | 5/1978 | Driller | 35/17 |

FOREIGN PATENT DOCUMENTS 482319 12/1916 France ............................................ 35/17

Primary Examiner—Harland S. Skogquist

[57] ABSTRACT

A structure for an electrical display of the human heart and cardiovascular system, which is useful in teaching the functioning of this system. A planar or raised outline drawing of the heart and related body parts is provided with a lamp and electrical contact in identifiable areas of the outline of the heart and other parts of the cardiovascular system. Two rows of electrical contacts are provided adjacent a tabulation of names of portions of the cardiovascular system, in order of blood flow. A power source, a bell, and two probes are provided. Touching one probe to a contact adjacent the name of a part of the cardiovascular system will cause a lamp in the corresponding outlined area to illuminate. Touching one probe to a different contact adjacent a name, and the other probe to a contact in the appropriate outlined area will cause a bell or buzzer to sound.

1 Claim, 1 Drawing Figure

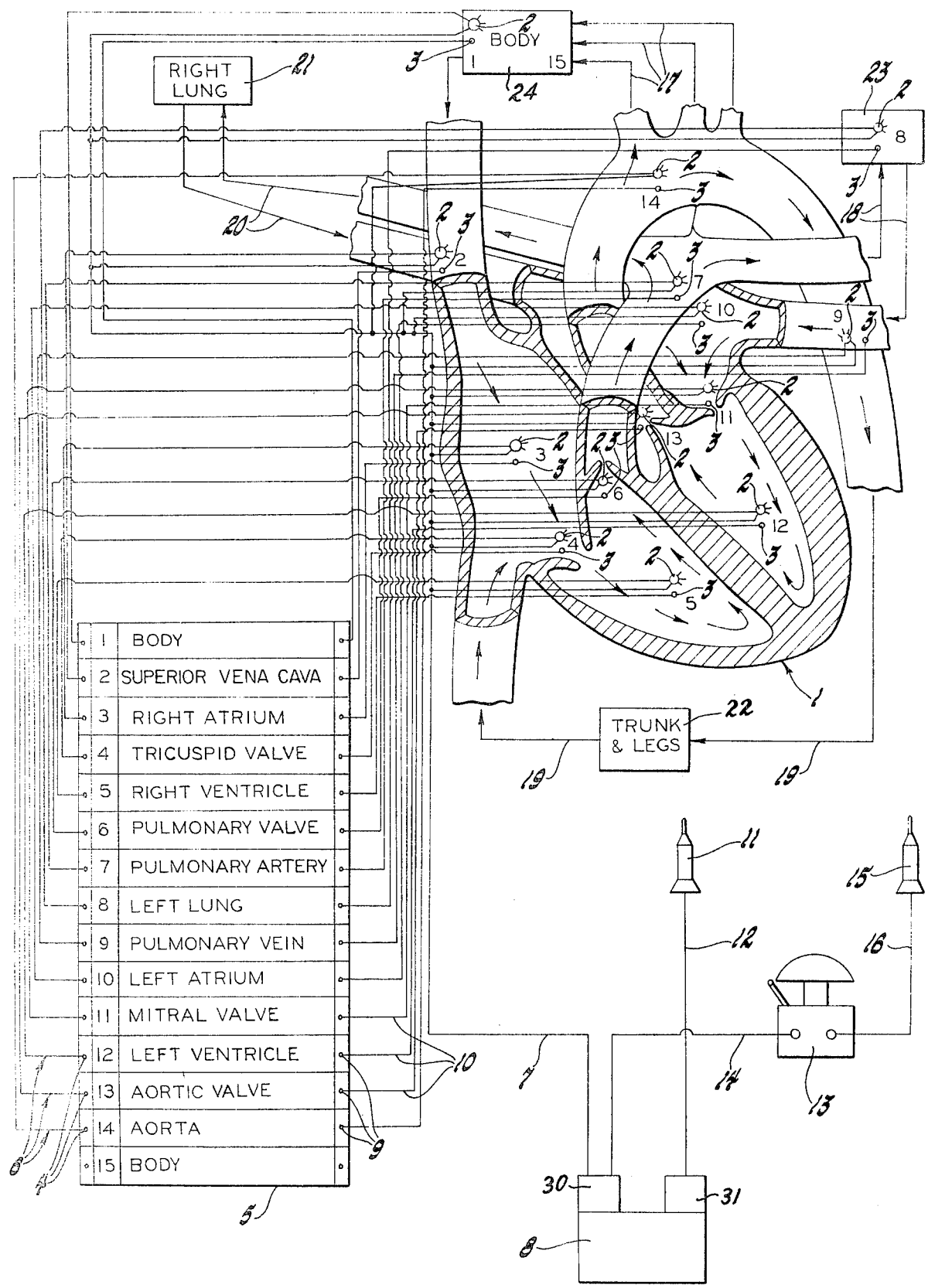

COMBINATION CARDIOVASCULAR ELECTRONIC DISPLAY/TEACHING APPARATUS, SYSTEM AND METHODS OF CONSTRUCTING AND UTILIZING SAME

BACKGROUND OF THE INVENTION

This invention relates generally to the field of education, in particular to the field of education as to the operation of the human heart.

SUMMARY OF THE INVENTION

It is a principal object of the invention to provide an electrical cardiovascular display system for the teaching of the basic operation of a human heart and cardiovascular system, suitable for use by both sighted and unsighted or blind persons.

It is an object of the invention to provide an electrical display system which is easy to manufacture and easy to use.

BRIEF DESCRIPTION OF THE DRAWING

FIG. 1 is a drawing of a cardiovascular display and teaching apparatus according to the invention.

DESCRIPTION OF THE PREFERRED EMBODIMENT

The preferred embodiment, as shown in FIG. 1, is made as simple as possible, to allow construction with common materials and tools, although more complex embodiments are possible without departing from the scope of the invention.

As is known, the human heart is a double pump, wherein the right side of the heart receives blood from the body, and pumps it to the lungs for substitution of oxygen for carbon dioxide, and the left side of the heart receives blood from the lungs and pumps it to the body.

Two large veins, the superior vena cava and the inferior vena cava, carry blood, depleted of oxygen and carrying carbon dioxide gas in solution, from the body to the right atrium. From the right atrium, blood passes through the tricuspid valve into the right ventricle. When the heart muscle (myocardium) surrounding the right ventricle contracts, the tricuspid valve closes, and blood is forced through the pulmonary artery, which branches to each lung, where differential partial pressures of oxygen and carbon dioxide cause exchange of these gasses through the membranes of the lung, so that carbon dioxide is removed from the blood, and the blood picks up oxygen. From the lungs, blood flows back to the heart through two pulmonary veins, which meet in the left atrium. From the left artium, blood flows through the mitral valve to the left ventricle. When the myocardium of the left ventricle contracts, the mitral valve closes, and blood flows through the aortic valve into the aorta, which has three branches to the upper body, and a branch which curves downwardly to supply blood to the lower body.

The present invention is adapted to facilitate the teaching of the operation of the heart, and of the terms used to describe its various parts.

In one simple embodiment, first means, including a heart outline component 1, is attached to a support member. Outline component 1 may include a line drawing, a raised and textured outline component, or a section of a commerically-available medical model. Illuminating means, such as an incandescent or other type of lamp 2, is placed through the support member in each area of the outline component 1, which it is desirable to identify. A lamp 2 is also placed through the support member adjacent indicia 21, 22, 23 and 24, representing other parts or components of the cardiovascular system or living organism body which it is desirable to identify. A first electrical terminal, such as a screw 3 or the like, is passed through the support member adjacent each lamp 2. At one edge of the support member, there is provided second means including a vertical row of second electrical terminals, such as screws or the like is passed through the support member, adjacent a vertical row of indicia components 5 identifying the parts of the cardiovascular system matching the locations in outline component 1 or indicia components 21, 22, 23 and 24 where lamps were placed, arranged in order of blood flow.

These indicia components 5 may be in the form of plane or raised letters or words, or in the form of braille characters, or both. Wires 6 are connected from one side of each light bulb 2 to each of the screws 4 or the like in the vertical row, and wire 7 is connected from the other side of each lamp 2 to one terminal 30 of power source 8. Power source 8 may be a transformer, a conventional power supply of an AC to DC converter type, or may be conventional batteries. Due to the low power required, the preferred embodiment utilizes batteries.

A separate vertical row of screws 9 or the like is emplaced through the support member adjacent the listing of indicia components 5. A wire 10 is connected from each of the screws 9 or the like to a corresponding screw 3 adjacent a lamp 2 in outline component 1 or indicia components 21, 22, 23 or 24.

A first electrically-conductive probe 11 is connected to a second terminal 31 of the power source 8 by wire 12. A bell 13 or the like is connected to the first terminal 30 of the power source 8 by wire 14, and a second electrically-conductive probe 15 is connected to the bell 13 or the like by wire 16. Both the power source 8 and the bell 13 may be mounted on the support member.

In use, when the first electrically-conductive probe 11 is moved down the first row of screws 4 or the like, lamps 2 will illuminate in an order corresponding to the direction of blood flow through the cardiovascular system. This function is useful as a lecture or demonstration tool, or as a self-teaching tool, to aid a student in learning and remembering the names of the parts of the human heart and cardiovascular system, and the direction of blood flow.

In this regard, certain indicia representing direction of blood flow through the heart and other parts of the cardiovascular system may be added. In the preferred embodiment, flow arrows indicate direction of blood flow through the heart, and lines 20, 19, 18 and 17 show blood flow outside the heart to indicia components 21, 22, 23 and 24, respectively, representing the right lung, the trunk and legs, the left lung, and the upper body. As above, these indicia components may also be discernable by touch.

The invention may also be used for self-testing by a student, or as a tool for use by a teacher or examiner. The teacher may place one probe, either 11 or 15, on a screw 9 adjacent the indicia representing a name for part of the cardiovascular system, and request the student to place the other probe or pointer on the screw 3 located in the named part of the cardiovascular system. If the student's choice is correct, the bell 13 will sound.

Portions of the aforementioned support member are broken away in the accompanying drawing in order to show the various electrical interconnections, while other portions of the support member are shown in the accompanying drawing by way of the components 1, 5, and 21–24.

It will be obvious that one skilled in the art could make numerous modifications to the disclosed structure without departing from the scope and intent of the invention.

I claim:

1. A cardiovascular teaching apparatus for use by persons who can see as well as by persons who cannot see comprising:

a support member;

first means (1, 21–24) on said support member including a fixed representation of predetermined components of a cardiovascular system and other components of a living organism;

said first means (1, 21–24) being discernible by touch as well as visually;

second means (4, 5, 9) on said support member including fixed indicia components discernible by touch as well as visually for identifying said predetermined components of said cardiovascular system and said other components of said living organism;

illuminating means (2) and a first electrical terminal (3) on said support member in predetermined areas of said fixed representation of said predetermined components of said cardiovascular system and said other parts of said living organism;

said fixed indicia components (5) of said second means discernible by touch as well as visually being disposed in an ordered arrangement corresponding to the path of the flow of blood through said predetermined components of said cardiovascular system and said other parts of said living organism;

said second means including a second electrical terminal (4) and a third electrical terminal (9) discernible by touch as well as visually and being provided adjacent to and associated with each fixed indicium component making up said fixed indicia components discernible by touch as well as visually;

a plurality of first conductors (10) electrically interconnecting said first electrical terminals (3) with said third electrical terminals (9);

a plurality of second electrical conductors (6) electrically interconnecting said illuminating means (2) with said second electrical terminals (4);

an electrical power source (8) having a first electrical terminal (30) and a second electrical terminal (31);

first probe means (11) electrically connected to said second electrical terminal (31) of said power source (8);

second probe means (15);

audible signal means (13) electrically connected between said second probe means (15) and said first electrical terminal (30) of said power source (8);

a plurality of third electrical conductors electrically connecting said first electrical terminal (30) of said power source (8) with said illuminating means (2);

whereby the illuminating means (2) in one of said areas will be energized when said first probe means (11) is brought into contact with the second electrical terminal of said second means which corresponds to the fixed indicium identifying such area in which the energized illuminating means (2) is located; and said audible signal means (13) will be activated when one of said first and second probe means (11, 15) is placed in contact with one of said third electrical terminals (9) of said second means, and the other of said first and second probe means (15, 11) is brought into contact with the particular one of said first electrical contacts (3) which is located in the predetermined area corresponding to the fixed indicium adjacent the particular third electrical terminal (9) which is in contact with said one of said first and second probe means (11, 15).

* * * * *